United States Patent [19]

Bleickert et al.

[11] Patent Number: 4,781,581
[45] Date of Patent: Nov. 1, 1988

[54] MELTING AND HOLDING FURNACE

[75] Inventors: Gerhard Bleickert, Sinsheim-Weiler; Stefan Fruh, Neckarbischofsheim, both of Fed. Rep. of Germany

[73] Assignee: Bleiwenz GmbH, Sinsheim-Weiler, Fed. Rep. of Germany

[21] Appl. No.: 59,992

[22] PCT Filed: Sep. 23, 1986

[86] PCT No.: PCT/EP86/00557
§ 371 Date: May 21, 1987
§ 102(e) Date: May 21, 1987

[87] PCT Pub. No.: WO87/02124
PCT Pub. Date: Apr. 9, 1987

[30] Foreign Application Priority Data

Sep. 27, 1985 [DE] Fed. Rep. of Germany ....... 3534484
Sep. 23, 1986 [EP] European Pat. Off. ........... 86/00557

[51] Int. Cl.⁴ ............................................. F27B 14/00
[52] U.S. Cl. .................................. 432/156; 432/159; 432/161; 432/214; 266/214
[58] Field of Search .......................... 432/156–161, 432/211, 214, 216; 266/214, 240, 283

[56] References Cited

U.S. PATENT DOCUMENTS

| 1,869,670 | 8/1932 | Darrah | 432/160 |
| 2,078,795 | 4/1937 | Forter | 432/159 |
| 2,527,144 | 10/1950 | Measham et al. | 432/161 |
| 2,654,591 | 10/1953 | Schmidt | 432/161 |
| 2,950,570 | 8/1960 | Cowles | 432/161 |
| 3,539,169 | 11/1970 | Higgs | 432/161 |
| 4,032,121 | 6/1977 | Stift et al. | 266/214 |
| 4,220,588 | 10/1980 | Ohara | 432/161 |
| 4,255,126 | 3/1981 | Buhler | 432/157 |
| 4,687,438 | 8/1987 | Schmidt et al. | 432/161 |

Primary Examiner—Henry C. Yuen
Attorney, Agent, or Firm—Michael F. Petock

[57] ABSTRACT

Melting and holding furnace in which melting (1) and holding (2) chambers are separated from one another, and are connected via openings (6). The holding chamber is designed to be deeper in order to receive the melt which flows out of the melting chamber (1). The chimney (18) through which the burnt gases produced during heating of the melting chamber (1) pass is arranged in the cover (14) of the holding chamber (2), namely at the end of the holding chamber (2) opposite to the openings (6).

4 Claims, 2 Drawing Sheets

MELTING AND HOLDING FURNACE

The present invention pertains to a melting and holding furnace according to the preamble of claim 1.

Known melting and holding furnaces have a burner in both the melting chamber and in the holding chamber to heat the metal to be melted and to keep the molten metal hot, and the combustion gases thus produced are exhausted through one or two stacks.

The disadvantage here is that the structure is expensive to build, and a great deal of energy is consumed in the form of the gas or oil burned in the two burners.

The task of the present invention is therefore to create a melting and holding furnace of the type described above with a much improved compact design, which therefore takes up much less room and which makes it possible to make much greater use of the energy supplied by permitting the complete combustion of all the flue gases, thus providing the advantage of environmental safety.

This task is accomplished in a melting and holding furnace of the type indicated by means of the features in the characterizing portion of claim 1.

The insight on which the invention is based therefore consists in conducting the off-gas stream from the burner, by means of which the material in the melting chamber is melted, forcibly over the surface of the molten metal in the separate holding chamber, so that in this way heat is maintained continuously and at the same time the unburned components of the off-gases are reburned. In addition, the oily components and other constituents which are present when recycled scrap is used or melted can also be burned. In this way, the energy yield is higher and the waste gas is cleaner, which means that the furnace according to the invention is environmentally safe. The production of this melting and holding furnace is simplified by the use of only a single burner.

It is advisable for the inside surface of the cover or roof of the holding chamber to be higher than the bottom of the melting chamber, so that a free space always remains between the surface of the molten bath and the inside surface just mentioned, by means of which the hot combustion gases can flow from the melting chamber to the stack along the surface of the molten bath.

To make it possible in all cases for the combustion gases to leave the melting chamber and to flow over the surface of the molten bath in the holding chamber to the stack, pressure-equalization channels are supplied in accordance with an additional embodiment of the present invention; these channels are provided in a wall of the melting chamber and/or its shaft facing the holding chamber. These pressure-equalization channels provide an alternative to the passages between melting chamber and holding chamber and function whenever the free cross section of the passages is reduced too much by a temporary excess of melt.

A simple method for removing molten metal from the melting and holding furnace according to the invention is achieved in that the entire unit consisting of melting chamber with burner and holding chamber can be tipped by means of hydraulic devices.

An exemplary embodiment of the invention is described below with reference to the attached drawings.

Figure 2:
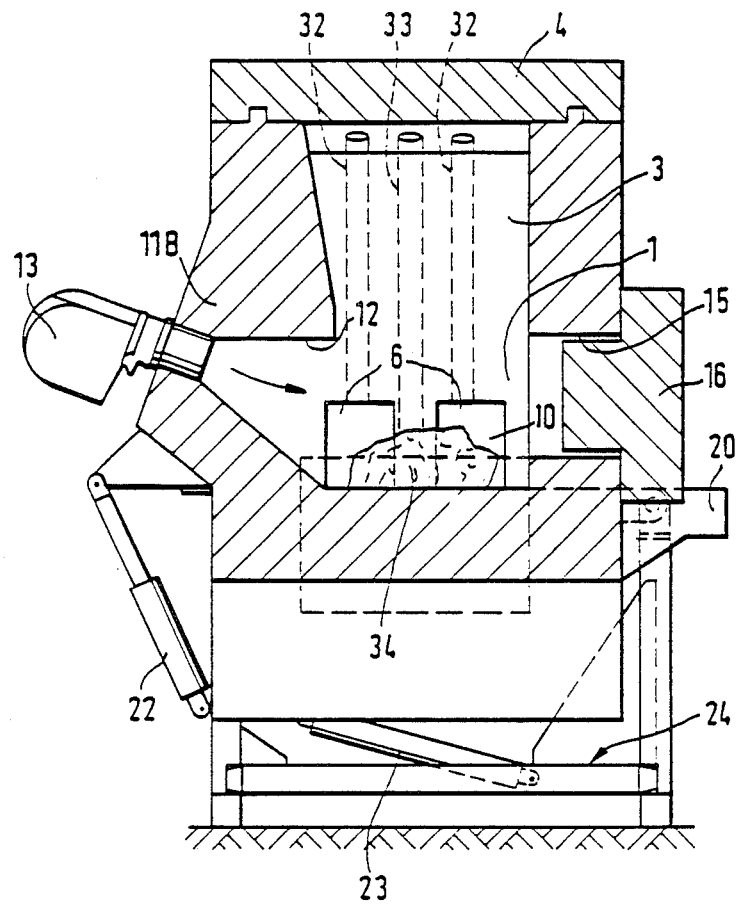
FIG. 2 shows a sectoion along line II—II of FIG. 1.

The melting and holding furnace, especially for nonferrous metals, has a melting chamber 1 and a holding chamber 2. Above melting chamber 1 there is loading shaft 3, which is closed at the top with a cover 4. Cover 4 is opened by means of a hydraulically actuated rod according to arrow A. When cover 4 is open, melting chamber 1 can be charged through loading shaft 3 with material to be melted (e.g., aluminum or aluminum alloys) by means of a loading machine (not shown). Between melting chamber 1 and holding chamber 2 there are slot-shaped (see FIG. 2) passages 6, preferably two, located at the sides. These passages 6 connect melting chamber 1 to holding chamber 2. Holding chamber 2 is lower than melting chamber 1, in such a way that surface 7 of molten metal 8 is lower than floor 9 of melting chamber 1. Passages 6 in wall 11A extend between chambers 1 and 2 and thus proceed downward at a slant.

In wall 11B of melting chamber 1 bordering wall 11A, there is a slanted shaft 12, in the end of which a burner 13 is installed. This burner is set up in such a way that its flame is directed toward the material 10 to be melted on floor 9 of melting chamber 1. On the side opposite the burner, melting chamber 1 has an additional opening 15, which is closed by a door 16. It facilitates the cleaning of the melting chamber and the adjustment of the burner flame.

Wall 11A of melting chamber 1 and its upward continuation 31, which forms a side wall of loading shaft 3, are provided with [provided with→—Tr. Ed.], for example, three internal channels 32, 33, which open out directly below cover 4 into the inside space of loading shaft 3. According to FIG. 2, channels 32, 33 are approximately parallel to each other and continue downward in wall 11A until they either arrive at passages 6 (the two uter channels 32) or open directly into holding chamber 2 (central channel 33) in the area of crosspiece 34 of wall 11A located between passages 6.

Holding chamber 2 is covered by a cover 14, which can be raised by means of a hydraulically actuated rod 17. In cover 14 [sic; →14—Tr. Ed.] there is a stack 18, which connects to a hot-air exhaust pipe, but which can also open out into an exhaust hood. In another exemplary embodiment (not shown), cover 14 [sic; →14—Tr. Ed.] is solid, and holding chamber 2 is provided on the end facing away from melting chamber 1 with a cleaning door similar to door 16.

Holding chamber 2 is also provided with an outlet spout 20, through the opening 21 in which the molten metal emerges from holding chamber 2 when the entire unit, consisting of melting chamber 1 and holding chamber 2, is tipped by means of hydraulically actuated rods 22, 23. The entire unit, which can be tipped in the manner described, is held in a welded iron frame 24.

When a "rod" is spoken about in the preceding, what is meant are hydraulically actuated units consisting of pistons and cylinders. The man of the art is fully aware of how these are to be designed for the matter at hand. For this reason, a detailed description for the present case can be omitted.

When material 10 to be melted is introduced into melting chamber 1 and melted by the heating of melting chamber 1 by means of burner 13, the molten metal flows through passages 6 into lower holding chamber 2. This is ensured by the fact that holding chamber 2 is situated lower down in the manner indicated than melting chamber 1; under certain conditions, floor 9 of melting chamber 1 can be slightly tilted toward passages 6, so that it is guaranteed in all cases that passages 6 lead from the lowest point of melting chamber 1 to holding chamber 8 located below.

Because inside surface 25 of cover 14 is higher than floor 9 of melting chamber 1, it is always ensured that a space 26 not occupied by molten metal always remains in holding chamber 2 above surface 7 of the molten metal. This makes it possible for the hot combustion gases, which are produced by the flame of burner 13 to melt material 10 in melting chamber 10, to flow through passages 6 and space 26, formed in holding chamber 2 between inside surface 25 of cover 14 and surface 7 of molten metal 8, to the stack and thus to escape from the furnace.

Figure 1:
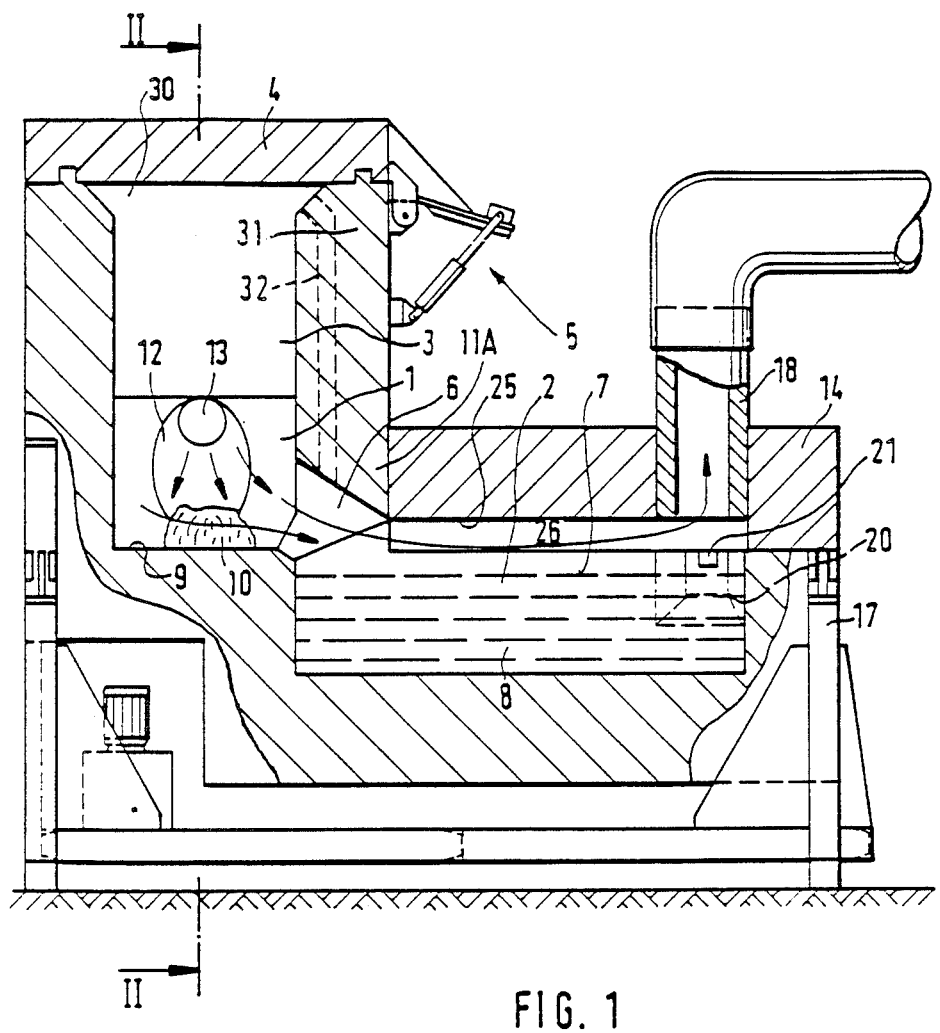
FIG. 1 shows a cross section through an exemplary embodiment.

Now, as shown in FIG. 1, stack 18 is located, as seen from passages 6, at the opposite end of holding chamber 2, so that the emerging hot gases are necessarily conducted over surface 7 of molten metal 8 as they flow toward stack 18. They can therefore serve to keep molten metal 8 hot in holding chamber 2, even though this chamber is separated in space from melting chamber 1. At the same time, these gases are reburned in space 26, because the high temperature prevailing there as a result of the heat stored by molten metal 8 ensures during this flow that any combustible components in the gas or in the melted recycled scrap which are not burned in melting chamber 1 or on emergence from burner 13 are burned during their flow through space 26. To this extent, the melting and holding furnace offers a 60–70% improvement in energy utilization in comparison with previous melting and holding furnaces, in which the burned gases escape directly from melting chamber 1 to stacks or exhaust pipes.

Channels 32, 33 serve as pressure-equalization channels between melting chamber 1 and holding chamber 2 to conduct away combustion gases when too much melt temporarily tries to flow through passages 6.

In an industrial embodiment of the invention, it is possible, for example, to assume a melting capacity of 100 kg of aluminum per hour and a holding capacity of 500 kg of aluminum per hour at a net calorific power ($H_u$) of 7,600 kcal/m$^3$n. For this purpose, about 5 m$^3$n/hr of gas are required. In the holding area, a temperature of 700°–800° C. is obtained, which can be regulated.

In this way a light, modern, and energy-conserving design for a melting and holding furnace is provided which is especially easy to operate and which in particular is especially favorable in terms of energy consumption. It is obvious that the walls should be insulated with high-quality light construction panels, and the internal space should be lined with refractory concrete. The systems for guiding the flame and conducting the hot gases are designed in a way that prevents the formation of smoke during the melting of recycled material.

SUMMARY

In a melting and holding furnace, a melting chamber (1) and a holding chamber (2) are separated from each other in space and are connected to each other by passages (6). The holding chamber is situated lower down than the melting chamber to receive the melt flowing out from the melting chamber (1).

The stack (18), through which the burned gases produced during the heating of the melting chamber (1) escape, is located in the cover (14) of the holding chamber (2), specifically, at the end of the holding chamber (2) opposite the passages (6).

We claim:

1. A melting and holding furnace, especially for non-ferrous metals, comprising a melting chamber and a holding chamber, which are separated from each other by a wall part and which are connected to each other by at least one passage and of which the holding chamber is situated lower than the melting chamber for receiving the molten metal discharging from the melting chamber after melting, said melting chamber being provided with an upwardly directed shaft and further including pressure-equalization channels provided in a wall of said melting chamber and/or its upwardly directed shaft facing said holding chamber, said pressure-equalization channels forming a connection between said melting chamber or shaft and said holding chamber and further comprising a burner pointed at the melting chamber from which burner the combustion gases formed during heating are guided through passages in the wall part to an outlet, wherein the inner surface of a cover of the holding chamber is situated at the level of the lower upper edge of at least one passage which is inclined between the melting chamber and the holding chamber and wherein the outlet is formed as a stack at the opposite end of the holding chamber in the holding chamber's cover, by which means the combustion gases are directed directly over the molten metal discharging from the melting chamber into the holding chamber through the at least one inclined passage into the holding chamber and from there along the surface of the molten metal bath to the outlet.

2. A melting and holding furnace in accordance with claim 1 wherein said inner surface of said cover of said holding chamber is higher than the floor of said melting chamber.

3. A melting and holding furnace in accordance with claim 1 wherein said melting chamber has an upwardly directed shaft, said shaft being provided with an openable and closable cover which may be opened to provide a loading opening.

4. A melting and holding furnace in accordance with claim 3 which further comprises hydraulic means for tipping said melting chamber, said burner, said holding chamber and the cover of said shaft of said melting chamber such that molten metal in said holding chamber may emerge through an outlet.

* * * * *